United States Patent

[11] 3,602,147

[72] Inventor William Barrie Hart
Burwell, England
[21] Appl. No. 835,582
[22] Filed June 23, 1969
[45] Patented Aug. 31, 1971
[73] Assignee Tracked Hovercraft Limited
London, England
[32] Priority June 24, 1968
[33] Great Britain
[31] 29982/68

[54] GAS CUSHION LOAD SUPPORTING DEVICE
15 Claims, 7 Drawing Figs.
[52] U.S. Cl................................................. 104/23 FS
[51] Int. Cl................................................. B60v 1/04
[50] Field of Search....................................... 104/23 FS,
134, 138, 148, 148 LM; 180/127–129

[56] References Cited
UNITED STATES PATENTS
3,130,804  4/1964  Bertin........................... 180/129

| 3,195,665 | 7/1965 | Beardsley | 180/129 |
| 3,254,732 | 6/1966 | Leathers | 180/129 |
| 3,381,772 | 5/1968 | Cockerell | 180/129 |
| 3,399,744 | 9/1968 | Hopkins | 180/128 |
| 3,477,387 | 11/1969 | Bing | 104/134 |

Primary Examiner—Arthur L La Point
Assistant Examiner—Richard A. Bertsch
Attorney—Cameron, Kerkam and Sutton ABSTRACT: A peripheral jet gas cushion load bearing or supporting device, particularly useful for a tracked gas cushion vehicle, has a deformable chamber for suspension between the member which forms a peripheral gas jet for containing the cushion and a supporting structure. Gas is fed to the gas jet independently of the chamber, and a passage interconnects the cushion and the deformable suspension chamber. Since the cushion pressure is dependent on the load carried, the pressure in the deformable suspension chamber will automatically adjust itself to the load in the vehicle.

PATENTED AUG 31 1971 3,602,147

GAS CUSHION LOAD SUPPORTING DEVICE

This invention relates to a gas cushion load bearing or supporting device and has particular application in a vehicle for travelling along a prepared track which guides the vehicle. Vehicles of this kind are disclosed in U.S. Pat. No. 3,174,440 and a method of propelling them in U.S. Pat. No. 3,356,041. Such vehicles are capable of high speeds, for instance faster than 200 kilometers per hour.

It is an object of this invention to provide a gas cushion load bearing or supporting device capable of supporting varying loads and which is particularly useful for such high speed vehicles.

According to the present invention there is provided a gas cushion load bearing or supporting device including a load bearing or supporting structure and a gas cushion member, the gas cushion member having means for forming a curtain of moving gas which, together with the cushion member, assists in containing a cushion of pressurized gas for spacing a load from a surface, and including a deformable chamber between the cushion member and load bearing or supporting structure, the cushion member being movable relative to said structure, characterized by means for feeding gas, other than gas in said chamber, to the curtain forming means, and characterized by a passage interconnecting the chamber with the gas cushion so that in operation gas in the chamber is responsive to the pressure of the cushion.

Since the gas in the chamber is fed from the cushion, the pressure in the chamber will vary with the pressure in the cushion, which in turn is a function of the load carried by the device. The pressure in the chamber will therefore vary in proportion to the load carried by the device.

In U.S. Pat. No. 3,381,627 a load bearing or supporting device is described in which a gas cushion forming member is separated from a load by a deformable chamber. However, in that arrangement the gas for the curtain flows from the chamber which is at a pressure determined by the gas supply, whereas in the device according to the present invention the gas curtain is fed with gas from a source other than the gas in the chamber. When the device of the present invention is in an equilibrium condition there is no flow of gas from the chamber to the cushion through the passage interconnecting them and both will be at the same pressure, which is a function of the load carried.

Preferably the deformable chamber is formed by the cushion member, the load bearing or supporting structure and a flexible membrane interconnecting the cushion member and the said structure. The flexible membrane is preferably so arranged that in use there is increasing resistance to movement of the cushion member as it approaches the load bearing or supporting structure.

When the device is in use on a vehicle, the vehicle is therefore provided with a two-stage suspension. The first suspension stage is provided by the gas cushion which permits some slight movement between the gas cushion member and the track to accommodate minor irregularities in the track. The clearance between the gas cushion member and the track (known as the hover-height) is preferably between 1 and 10 centimeters and therefore not much movement in the first stage of suspension can be tolerated. The second stage of suspension is provided by the chamber, and this may be arranged to allow for movement in the order of plus or minus about 10 centimeters, such as may be required to accommodate undulations in the track. As described above, the pressure in the second stage of suspension automatically adjusts itself to the load carried by the vehicle.

Preferably the passage interconnecting the cushion and chamber is provided by an opening in a base of the cushion member.

In one preferred embodiment an extensible duct constitutes means for feeding gas to the curtain forming means. In another embodiment the means for feeding gas consists of a nozzle connected to the load bearing or supporting structure which in use supplies pressurized gas into a converging passage forming part of the curtain forming means to entrain ambient air to issue from the curtain forming means. Both these means for feeding gas to the curtains allow movement of the cushion member relative to the load bearing or supporting structure.

According to another aspect of the present invention there is provided a gas cushion load bearing or supporting device including a load bearing or supporting structure and a gas cushion member, the gas cushion member having means for forming a curtain of moving gas which, together with the cushion member, assists in containing a cushion of pressurized gas for spacing a load from a surface, and including a deformable chamber between the cushion member and the load bearing or supporting structure to allow for movement of the cushion member relative to the said structure, characterized in that the deformable chamber is formed by a continuous sheet of flexible material extending from one side of the cushion member to the other and engaging the underside of the load bearing or supporting structure. Said underside may be V-shaped.

In order that the invention may be well understood, preferred embodiments will now be described in detail with reference to the accompanying drawings in which.

Figure 1:
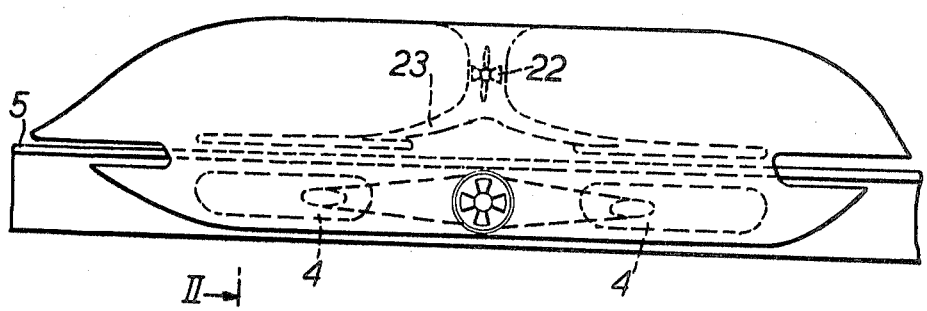
FIG. 1 is a diagrammatic side view of a vehicle embodying the invention mounted on a track.
Figure 2:
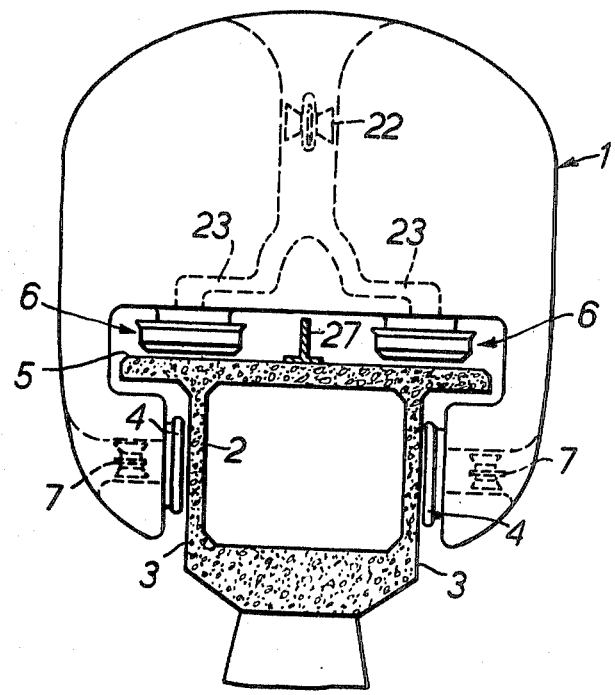
FIG. 2 is a diagrammatic cross section along the line II—II of FIG. 1.
Figure 3:
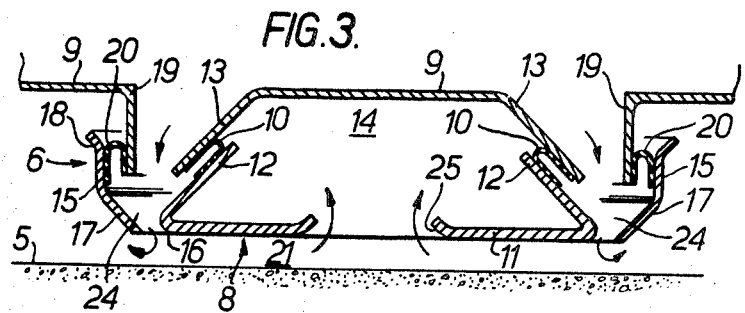
FIG. 3 is an enlarged cross section of part of FIG. 2.

FIGS. 1 and 2 show a track guided vehicle 1 for travelling along a prepared concrete track 2. The track 2 has vertical surfaces 3, with which gas cushion load supporting devices 4 on the vehicle 1 cooperate to support the vehicle. As can be seen in FIGS. 1 and 2, there are two pairs of supporting devices 4 and 6 and each supporting device has two long sides parallel to the length of the vehicle and two rounded ends. The devices 4 are each supplied with pressurized air by means of fans 7 and have nozzles about their periphery from which the pressurized air issues in the form of an air curtain which contains an air cushion. The devices 4 are movably connected to the vehicle 1 and include a suspension system of the kind described in U.S. Pat. No. 3,477,387. The vehicle 1 is propelled by a linear motor stator (not shown) which cooperates with a reaction rail 27 along the track 2. FIG. 3 shows a supporting device 6 for the vehicle shown in FIGS. 1 and 2. The device 6 includes a cushion member 8 which is connected to a load supporting structure 9 (forming part of the vehicle) by a flexible membrane 10. A deformable chamber 14 is formed between the cushion member 8 and the supporting structure 9 by the load member 9, the cushion member 8 and the membrane 10. The cushion member 8 has a base 11 and incline walls 12 on the side furthest from the track surface 5. The load member 9 has inclined walls 13 parallel to the walls 12. The flexible membrane 10 interconnects the walls 12, 13 about the whole periphery of the cushion member 8 and presents a convex surface as seen from inside the chamber 14.

The cushion member 8 also has walls 15 spaced outwardly from the walls 12 and extending away from the track surface 5. The walls 15 have portions 17 which are inclined in the opposite sense with respect to the walls 12, and the walls 12 and wall portions 17 form inwardly inclined nozzles 16 which constitute means for forming a curtain of moving gas which together with the base 11 of the cushion member 8 partially contains a cushion 21 of pressurized gas acting on the surface 5 of the track. The wall 15 has a vertical portion 18 which is connected to a vertical downwardly depending wall 19 on the load member 9 by a flexible membrane 20. The walls 19 and 13 of the load member 9 and the membranes 10 and 20 form an extensible duct 24 for feeding pressurized gas from a fan 22 in the vehicle and from the ducts 23 (see FIG. 1) to the nozzles 16. In operation the membrane 20 presents a convex shape to the exterior of the supporting device 6. The membranes 10 and 20 enable the cushion member 8 to move towards and away from the vehicle body.

The base 11 of the cushion member 8 has a central opening 25 so that a passage interconnects the chamber 14 with the gas cushion 21.

In operation pressurized gas is fed via the duct 23 and passage 24 and emerges as a curtain from the nozzles 16. The gas fed to the nozzles 16 does not come from the chamber 14. Some of the gas forms the cushion 21. The cushion 21 is about 2 centimeters thick and when the cushion has been formed it is contained by the curtain. The chamber 14 receives gas from the cushion 21 and in the equilibrium condition the chamber 14 is therefore at cushion pressure. In the equilibrium condition there will be no flow of gas through the opening 25.

The cushion provides a primary suspension in will accommodate minor irregularities in the track. The chamber 14 provides a secondary suspension and allows a movement of several inches of the cushion member 8 relative to the vehicle.

The cushion pressure depends upon the load in the vehicle, and since the pressure in the chamber 14 equals the cushion pressure, the secondary suspension will automatically adjust itself to the load in the vehicle.

Figure 4:
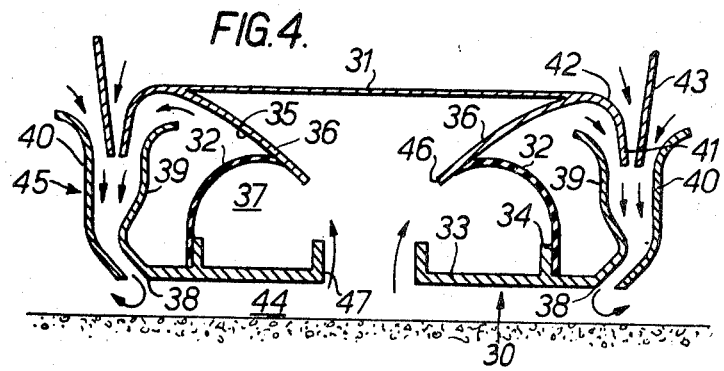
FIGS. 4 and 5 show diagrammatic cross-sectional views of alternatives to the device shown in FIG. 3.

FIG. 4 shows a supporting device 45 for the vehicle shown in FIGS. 1 and 2 which is alternative to the device 6 shown in FIG. 3. The device 45 includes a cushion member 30 connected to a load supporting structure 31 (forming part of the vehicle) by a flexible membrane 32. The cushion member 30 has a base 33 with an upstanding wall 34 to which the membrane 32 is connected. The other edge of the membrane 32 is connected to an inclined lower surface 35 of a wall 36 connected to the structure 31. The wall 36 is endless and is inclined so that the inner edge 46 is lowermost. A chamber 37 is defined by the cushion member 30, the structure 31 and the membrane 32.

The cushion member 30 has a peripheral, inwardly inclined nozzle 38 formed by two walls 39 and 40. The walls 39 and 40 diverge outwardly with increasing distance from the base 33. Nozzles 41 are also formed on the structure 31 by downwardly extending walls 42, 43. The walls 42, 43 fit into the converging passage formed by the walls 39 and 40, and when pressurized gas is fed to the nozzles 41, ambient air is entrained between the walls 39, 42 and 40, 43 and issues from the nozzles 38 in the form of a curtain to contain a gas cushion 44. As with the device in FIG. 3 the chamber 37 acts as the secondary suspension and therefore the walls 39, 40 will move vertically with respect to the nozzle 41. The nozzle 41 and the walls 39, 40 are therefore so constructed that a gas curtain will issue from the nozzle 38 despite said movement.

The base 33 has an opening 47. The operation of the device 45 is generally similar to that of the device 6 in FIG. 3. When the cushion member 30 moves upwardly the membrane 32 progressively engages the inclined surface 35 so that the pressure in the chamber 37 effectively acts on a progressively larger area of the supporting structure 31. This provides stiffness for the secondary suspension. This stiffness can be chosen by suitably choosing the angle of inclination of the wall 36. The more nearly the wall 36 approaches to the horizontal the stiffer the suspension. In a modified arrangement the angle of inclination of the wall 36 is adjustable.

Figure 5:
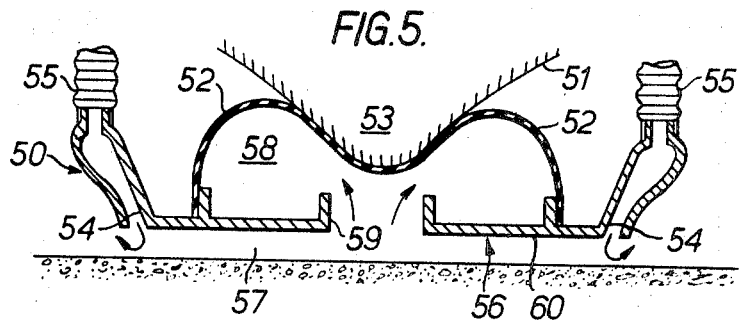

FIG. 5 shows a supporting device 50 as an alternative to the devices 6 and 45 of FIGS. 3 and 4.

The device 50 is similar to the device 45 of FIG. 4 but differs in two respects. First, the inclined surface 51 with which the membrane 52 progressively engages is the shallow V-shaped underside of the supporting structure 53 which forms part of the vehicle. This enables the membrane 52 to be a continuous sheet extending from one side of the cushion member 56 to the other. Second, the nozzles 54 receive pressurized gas from flexible and extensible ducts 55 which permit movement of the cushion member 56 with respect to the vehicle. As before a cushion 57 is formed which communicates with chamber 58 via opening 59 in the base 60 of the cushion member 56.

Figure 6:
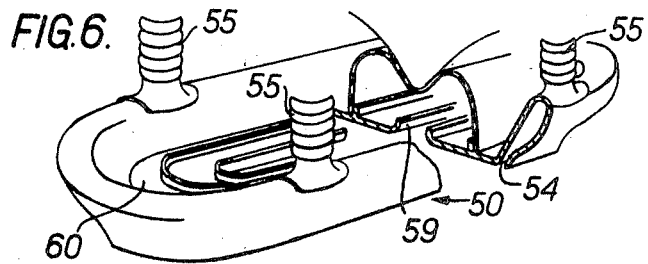
FIG. 6 is a perspective view of the device shown in FIG. 5.

FIG. 6 is a diagrammatic perspective view of the device 50. It shows the general shape of the device 50 with two long parallel sides and rounded ends. The nozzle 54 is shown in section and is connected to four flexible ducts 55.

The arrangement shown in FIGS. 5 and 6 has the advantage that the whole cushion member together with the membrane 52 can be removed for maintenance very simply. The four ducts 55 merely have to be disconnected.

Figure 7:
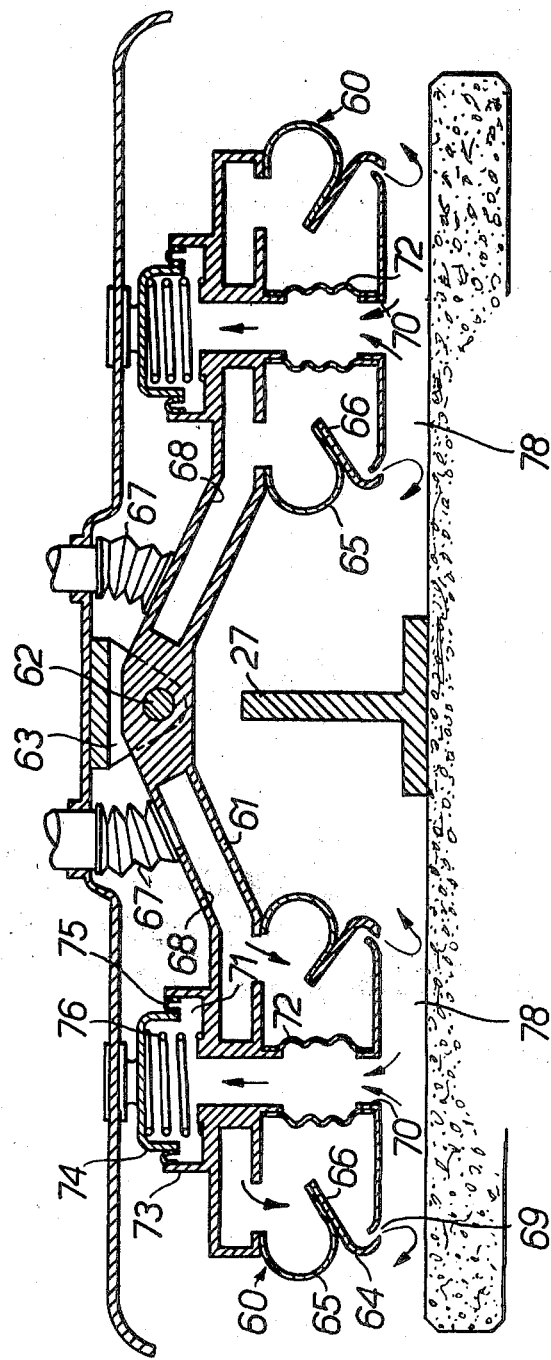
FIG. 7 is a cross-sectional view of another device for supporting the vehicle of FIGS. 1 and 2.

FIG. 7 shows a pair of supporting devices 60 which can also be used to support the vehicle shown in FIGS. 1 and 2.

The devices 60 are mounted on opposite ends of a beam 61 which is pivoted at 62 to a projection 63 at the mid point of the underside of the vehicle (as seen in a lateral cross section). A cushion member 64 is connected to each end of the beam 61 by a membrane 65 which engages an inclined wall 66 of the cushion member 64. Gas is fed to the cushion via flexible ducts 67 connecting the beam 61 to the vehicle, and then via passages 68 through the beam and emerges from inwardly inclined nozzles 69 to form a curtain of gas to contain a cushion 78. The base of the cushion member 64 has an opening 70 which communicates with a deformable chamber 71 between the beam 61 and the underside of the vehicle, via an extensible duct 72 which forms a passage.

The deformable chamber 71 is formed by an upstanding annular wall 73 on the beam 61 and a downwardly depending annular wall 74 of smaller radius connected to the underside of the vehicle. A rolling diaphragm 75 interconnects the annular walls 73, 74. A mechanical spring 76 within the chamber 71 biases the beam 61 away from the vehicle.

In the device 60, the cushion acts as the first suspension stage, the gas contained by the membrane 65 as the second suspension stage, and the chamber 71 as a third suspension stage. The pressure in the third suspension stage is responsive to cushion pressure. When the vehicle rolls the springs 76 will transmit a force to the beam 61 which will tilt. This will result in one cushion member 64 approaching the track and the other moving away from the track. The cushion pressure of the member 64 which approaches the track will increase and the cushion pressure on the other side will decrease. Any increase in pressure in the cushion is communicated via the opening 70 and duct 72 to the chamber 71 which therefore biases one side of the vehicle away from the beam. The biasing forces in the chamber 71 will therefore increase on the lower side of the vehicle and decrease on the other side so as to produce a righting couple on the vehicle.

I claim:c8

1. A gas cushion load bearing device for spacing a load from a bearing surface, comprising a load bearing structure, a gas cushion member mounted for relative movement towards and away from the load-bearing structure perpendicularly to the bearing surface and having curtain forming means for forming a curtain of moving gas for peripherally containing, at least in part, a cushion of pressurized gas formed between the device and the bearing surface, and a deformable chamber between the cushion member and the load bearing structure, wherein the improvement comprises: (a) gas supply means for feeding gas, other than gas in said chamber, to the curtain forming means, and (b) a passage interconnecting the chamber with the gas cushion so that in operation the pressure of gas in the chamber is responsive to cushion pressure.

2. A device as claimed in claim 1 in which the deformable chamber is formed by the cushion member, the load bearing structure and a flexible membrane interconnecting the cushion member and the load bearing structure, the flexible membrane being a sheet extending from one side of the cushion member to the other side.

3. A device as claimed in claim 1 in which the deformable chamber is defined, at least in part, by a flexible membrane so arranged as to provide increasing resistance to a relative approaching movement of the cushion member and the load bearing structure.

4. A device as claimed in claim 1 in which the deformable chamber is defined, at least one in part, by a flexible membrane so arranged as to engage at least one of the load bearing structure and the cushion member at an area of contact which increases with a relative approaching movement of the cushion member and the load bearing structure whereby to provide increasing resistance to such movement.

5. A device as claimed claim 4, wherein the gas supply means is provided in part by said flexible membrane, said membrane comprising a single fold of flexible material which is concave to gas in the gas supply means and is convex to said deformable chamber, the said membrane being arranged for engaging at least one of the load bearing structure and the cushion member increasingly inwardly of the chamber with the said relative approaching movement of the cushion member and the load bearing structure whereby to provide the increasing resistance said acid movement.

6. A device as claimed in claim 5, wherein the load bearing structure and the cushion member are formed with generally parallel opposed surfaces inclined both to the said relative movement of the load bearing structure and the cushion member and also to the bearing surface, the flexible membrane being interposed between the opposed surfaces so as to engage an increasing area of each surface with the said relative approaching movement of the cushion member and the load bearing structure.

7. A device as claimed in claim 1, wherein for accommodating said relative movements of the cushion member and the load bearing structure the gas supply means include at least one extensible duct.

8. A device as claimed in claim 1, wherein the gas supply means comprise a nozzle connected to the load bearing structure and the curtain forming means comprise a converging passage arranged for receiving gas issuing from the said nozzle together with ambient air entrained by the said gas and for directing the gas and entrained air towards the hearing surface inwardly of the gas cushion, the nozzle and the converging passage being arranged in spaced relation for accommodating said relative movements of the cushion member and the load bearing structure.

9. A device as claimed in claim 4, wherein the flexible membrane comprises a single fold of flexible material separating the said deformable chamber from a further chamber, the gas supply means comprising a nozzle connected to the load bearing structure and the curtain forming means comprising a converging passage arranged for receiving, in addition to gas issuing from said nozzle, air from said further chamber entrained by said gas and for directing the gas and entrained air towards the bearing surface inwardly of the gas cushion, the nozzle and converging passage being arranged in spaced relation for accommodating said relative movements of the cushion member and the load bearing structure.

10. A gas cushion load bearing device for spacing a load from a bearing surface, comprising
 a load bearing structure,
 a further structure mounted for relative movement towards and away from the load bearing structure perpendicularly to the bearing surface,
 a first deformable chamber between the load bearing structure and the further structure,
 a gas cushion member at the side of said further structure remote from the load bearing structure and mounted for relative movement towards and away from the further structure perpendicularly to the bearing surface,
 a second deformable chamber between the further structure and the gas cushion member and defined, at least in part, by a flexible membrane arranged for providing increasing resistance to a said relative approaching movement of the cushion member and the further structure,
 gas supply means for feeding gas to the second deformable chamber, the cushion member being formed with curtain forming means arranged for receiving gas from said second deformable chamber and for forming a curtain of moving gas for peripherally containing, at least in part, a load bearing cushion of pressurized gas formed between the device and the bearing surface by directing the gas received from the second deformable chamber towards the bearing surface and inwardly of the gas cushion,
 a passage interconnecting the first deformable chamber with the gas cushion so that in operation the pressure of gas in the first deformable chamber is responsive to cushion pressure, and
 means for providing increasing resistance to a said relative approaching movement of the gas cushion and the further structure.

11. A device as claimed IN Claim 10, wherein the said means for providing increasing resistance to the said relative approaching movement of the cushion member and the further structure comprise spring biasing means disposed in said first deformable chamber and arranged to bias the load bearing structure and the further structure away from one another.

12. A gas cushion vehicle adapted for operation along a prepared track and comprising
 a vehicle body,
 first and second gas cushion load bearing devices arranged for spacing the vehicle body from the track by cooperation with the track at respective first and second generally coplanar bearing surfaces, each gas cushion load bearing device comprising
 a load bearing structure mounted on the vehicle body,
 a further structure mounted for relative movement towards and away from the load bearing structure perpendicularly to the bearing surface,
 a first deformable chamber between the load bearing structure and the further structure,
 a gas cushion member at the side of the further structure remote from the load bearing structure and mounted for relative movement toward and away from the further structure perpendicularly to the bearing surface,
 a second deformable chamber between the further structure and the gas cushion member and defined, at least in part, by a flexible membrane arranged for providing increasing resistance to a said relative approaching movement of the cushion member and the further structure,
 gas supply means for feeding gas to the second deformable chamber, the cushion member being formed with curtain forming means arranged for receiving gas from said second deformable chamber and for forming a curtain of moving gas for peripherally containing, at least in part, a load bearing cushion of pressurized gas formed between the cushion member and the respective said bearing surface by directing the gas received from the second deformable chamber towards the respective bearing surface and inwardly of the gas cushion,
 a mechanical connection between the further structures of the first and second gas cushion load bearing devices and pivotally mounted on the vehicle body intermediate the load bearing devices, and
 means for providing increasing resistance to a pivotal movement of the connection from a predetermined angular position.

13. A device as claimed in claim 12, wherein the said means for providing increasing resistance to a pivotal movement of the connection from the predetermined angular position comprise spring biasing means in each first deformable chamber and arranged to bias the respective load bearing structure and further structure away from one another.

14. A gas cushion vehicle adapted for operation along a prepared track and comprising
 a vehicle body,
 a gas cushion load bearing device for spacing the vehicle body from the track by cooperation with the track at a bearing surface, the device comprising a load bearing structure mounted on the vehicle body, a gas cushion member mounted for movement towards and away from the load bearing structure perpendicularly to the bearing surface and having curtain forming means for forming a curtain of moving gas for peripherally containing, at least in part, a cushion of pressurized gas formed between the device and the bearing surface, a deformable chamber between the cushion member and the load bearing structure, gas supply means for feeding gas, other than gas in said chamber, to the curtain forming means, and a passage interconnecting the chamber with the gas cushion so that in operation the pressure of gas in the chamber is responsive to cushion pressure.

15. A gas cushion load bearing device for spacing a load from a bearing surface, comprising a load bearing structure, a gas cushion member mounted for movement towards and away from the load bearing structure perpendicularly to the bearing surface and having curtain forming means for forming a curtain of moving gas for peripherally containing, at least in part, a cushion of pressurized gas formed between the device and the bearing surface, a deformable chamber between the cushion member and the load bearing structure and defined, at least in part, by a generally tubular flexible membrane of flexible sheet material, the membrane being arranged for engaging the load bearing structure at a generally V-shaped surface of the load bearing structure having its apex towards the deformable chamber, a said relative approaching movement of the cushion member and the load bearing structure causing the flexible membrane to engage the V-shaped surface at an increasing area of contact at each side of the apex and so providing increasing resistance to such movement, gas supply means for feeding gas, other than gas in the said chamber, to the curtain forming means, and a passage interconnecting the chamber with the gas cushion so that in operation the pressure of gas in the chamber is responsive to cushion pressure.